(12) United States Patent
Senechal et al.

(10) Patent No.: US 10,274,629 B2
(45) Date of Patent: Apr. 30, 2019

(54) METHOD AND SYSTEM FOR TRANSMITTING SIGNALS ON A MULTI-CONDUCTOR CABLE

(71) Applicant: SERCEL, Carquefou (FR)

(72) Inventors: Emmanuel Senechal, Carquefou (FR); Fatima Ghanem Elkorso, Carquefou (FR)

(73) Assignee: SERCEL, Carquefou (FR)

( * ) Notice: Subject to any disclaimer, the term of this patent is extended or adjusted under 35 U.S.C. 154(b) by 19 days.

(21) Appl. No.: 15/183,979

(22) Filed: Jun. 16, 2016

(65) Prior Publication Data
US 2016/0370486 A1 Dec. 22, 2016

(30) Foreign Application Priority Data

Jun. 18, 2015 (EP) .................................... 15305945

(51) Int. Cl.
| | | |
|---|---|---|
| G01V 1/52 | (2006.01) | |
| G01V 1/22 | (2006.01) | |
| E21B 47/12 | (2012.01) | |
| H04B 3/28 | (2006.01) | |
| H04B 3/30 | (2006.01) | |
| G01V 1/18 | (2006.01) | |
| H04B 3/32 | (2006.01) | |
| H04B 3/50 | (2006.01) | |

(52) U.S. Cl.
CPC ................ *G01V 1/52* (2013.01); *E21B 47/12* (2013.01); *G01V 1/18* (2013.01); *G01V 1/22* (2013.01); *H04B 3/28* (2013.01); *H04B 3/30* (2013.01); *H04B 3/32* (2013.01); *H04B 3/50* (2013.01)

(58) Field of Classification Search
CPC ... H04B 3/28; H04B 3/30; H04B 3/32; H04B 3/50; E21B 47/12; G01V 1/18; G01V 1/22; G01V 1/52

USPC .......................................................... 367/25
See application file for complete search history.

(56) References Cited

U.S. PATENT DOCUMENTS

| | | | |
|---|---|---|---|
| 4,855,732 A | 8/1989 | Cretin et al. | |
| 6,226,330 B1 | 5/2001 | Mansur | |
| 8,565,418 B2 * | 10/2013 | Li | H04L 5/20 379/417 |

FOREIGN PATENT DOCUMENTS

WO WO-2016043778 A1 * 3/2016 ............. E21B 47/12

OTHER PUBLICATIONS

Search Report dated 2015.

* cited by examiner

*Primary Examiner* — Daniel L Murphy
(74) *Attorney, Agent, or Firm* — Ipsilon USA, LLP

(57) ABSTRACT

A method is provided for transmitting signals on a multi-conductor cable (12) formed from a plurality of conductors (1-7) surrounded by an armor (10), the plurality of conductors having a central conductor (7) surrounded by a first peripheral layer of conductors (1-6) with an even number of conductors symmetrically arranged around the central conductor. The two following transmission modes are carried out simultaneously: a common mode (TX1) that uses the central conductor (7) with a return on the armor (10), for transmitting a first signal ($s_1$); and a differential mode (TX2) between a first path comprising all odd rank conductors (1,3,5) of the peripheral layer and a second path comprising all even rank conductors (2,4,6) of the peripheral layer, for transmitting a second signal ($s_2$).

20 Claims, 3 Drawing Sheets

METHOD AND SYSTEM FOR TRANSMITTING SIGNALS ON A MULTI-CONDUCTOR CABLE

RELATED APPLICATIONS

This applications claims the benefit of priority from European Patent Application No. 15 305 945.6, filed on Jun. 18, 2015, the entirety of which is incorporated by reference.

BACKGROUND

Field of the Disclosure

The field of the disclosure is that of signal transmission systems and methods.

More specifically, the disclosure relates to methods and systems for transmitting signals on a multi-conductor cable comprising a plurality of conductors surrounded by an armor, the plurality of conductors comprising a central conductor surrounded by at least a first peripheral layer of conductors comprising an even number of conductors symmetrically arranged around the central conductor.

The disclosure can be applied notably, but not exclusively, when the multi-conductor cable is a hepta-cable.

The disclosure can be applied notably, but not exclusively, for the transmission of signals between a first unit situated at a predetermined depth of a well and a second unit situated at the surface of the well.

In a particular case, the first unit and the second unit are respectively a telemetry unit and a surface central unit which are part of a seismic monitoring system.

Description of Related Art

It is sought more particularly here below in this document to describe problems existing in the field of seismic monitoring system. The disclosure of course is not limited to this particular field of application but is of interest for any solution for transmitting signals on a multi-conductor cable that has to cope with closely related or similar issues and problems.

Basically, and as shown in FIG. 1, a seismic monitoring system comprises some sensors 15a, 15b (also referred to as "seismic sensing tools") disposed in a well 14 and along a tool bus (communication link) 16 and which transmit their data to a telemetry unit 11. The telemetry unit 11 later processes these data and sends them to a surface central unit 13 through a cable 12. The telemetry unit 11 is situated at a predetermined depth of the well (it might be disposed downhole, and associated with the seismic sensing tools, or at the top of the well, while the seismic sensing tools are far down).

The cable 12 linking the telemetry unit 11 and the surface central unit 13 is typically a hepta-cable as shown in FIG. 2, i.e. a multi-conductor cable comprising a plurality of conductors 1-7 surrounded by an armor 10. The plurality of conductors comprises a central conductor 7 surrounded by a peripheral layer of six conductors 1-6 symmetrically arranged around the central conductor 7.

A hepta-cable can provide for various signal propagation modes (also referred to as "transmission modes" or "configurations of transmission"), each of which transmits signals on a specific combination of the seven conductors 1-7 and armor 10.

When a single transmission is needed, the hepta-cable is usually used in a "common mode", consisting in transmitting the signal over the central conductor 7 with a return on the armor 10 (and sometimes also on some or all of the peripheral conductors 1-6). This type of propagation mode provides a channel having a good quality.

FIG. 3-3 of EP2741427 discloses an example of such a common mode.

Another type of propagation mode in a hepta-cable is referred to as "differential mode", consisting in delivering equal but opposite AC voltages and currents on a first conductor (or a set of first conductors) and a second conductor (or a set of second conductors). This type of propagation mode provides immunity to common mode noise.

FIG. 3-1 of EP2741427 discloses such a differential mode.

In order to increase the data rate, EP2741427 discloses a different use of the hepta-cable, with two simultaneous transmissions.

However, it appears that these multiple transmissions on the different conductors of the cable lead to the generation of cross-talk. The cross talk (also referred to as "channels' interference") is an unwanted source of noise in data transmissions: the data transmitted via a conductor are polluted by the data transmitted simultaneously via another conductor of the same cable. Cross-talk may limit the available data rate and reliability.

Consequently, and as disclosed in detail in EP2741427, a hard data processing (or a use of a complex hardware) is needed because of cross-talk, when it is intended to increase the transmission rate.

OBJECTS AND SUMMARY

The invention is aimed at overcoming some drawbacks of the prior art.

More specifically, it is a goal of at least one embodiment of the invention to provide a solution for transmitting signals on a multi-conductor cable, this solution enabling to increase the transmission rate while having a very low cross-talk (and thus no need to carry out a hard data processing or to use a complex hardware).

It is another goal of at least one embodiment of the invention to provide a solution of this kind which is easy to implement and inexpensive.

It is another goal of at least one embodiment of the invention to provide a solution of this kind which is still applicable, even if a not negligible cross-talk arises.

A particular aspect of the present disclosure relates to a method for transmitting signals on a multi-conductor cable comprising a plurality of conductors surrounded by an armor, the plurality of conductors comprising a central conductor surrounded by a first peripheral layer of conductors comprising an even number of conductors symmetrically arranged around the central conductor. The two following transmission modes are carried out simultaneously:
  a common mode that uses the central conductor with a return on the armor, for transmitting a first signal ($s_1$); and
  a differential mode between a first path comprising all odd rank conductors of the peripheral layer and a second path comprising all even rank conductors of the peripheral layer, for transmitting a second signal ($s_2$).

The general principle is that of combining two transmission modes on the same cable thus increasing the transmission rate): a common mode and a differential mode using conductors having specific symmetry features. All odd rank conductors and all even rank conductors of a peripheral layer are used to carry out the differential mode and they are symmetrically arranged around the central conductor.

It has to be noted that only the two specific aforementioned transmission modes are carried out on said cable and in a simultaneous way, what enables to simply and efficiently double the transmission rate, thanks to the very low resulting cross-talk that this configuration enables.

The main advantage of this solution is the very low cross-talk between the two transmission modes. Indeed, the cross-talk suffered by the central conductor (used in the common mode) because a signal is sent (positive path of the differential mode) on all even rank conductors of the peripheral layer, is compensated by the cross-talk suffered by the central conductor because the same but opposite signal is sent (negative path of the differential mode) on all odd rank conductors of the peripheral layer. Similarly, the cross-talk suffered by the even rank conductors (used in the differential mode) because a signal is sent (in the common mode) on the central conductor, is compensated by the cross-talk suffered by the odd rank conductors (also used in the differential mode) because of the aforesaid signal sent (in the common mode) on the central conductor. These compensations occur since the conductors of the peripheral layer are symmetrically arranged around the central conductor besides the use of the differential mode providing immunity to common mode noise.

In other words, thanks to the symmetrical configuration of the odd and even conductors around the central connector and to the simultaneous use of the common mode and of the differential mode, the resulting cross-talk suffered in the common mode because of the simultaneous use of the differential mode is very low since the cross-talk suffered by the central conductor due to the even conductors is compensated by the opposite cross-talk suffered by the central conductor due to the odd conductors. In addition, the resulting cross-talk suffered in the differential mode because of simultaneously using the common mode is very low since the odd and even conductors are, thanks to their symmetrical configuration around the central connector, similarly impacted by the cross-talk due to the central connector. Conversely, as detailed hereafter, a combination of three transmission modes would lead to too much cross-talk, while increasing the complexity of the needed hardware.

The very low cross-talk of this solution enables to increase the transmission rate, with no need to carry out a hard data processing or to use a complex hardware. As detailed below, even if the very low cross-talk is non negligible, the proposed solution needs only a light data processing.

According to a particular feature, the multi-conductor cable is a hepta-cable comprising a central conductor surrounded by a single peripheral layer comprising six conductors.

According to a particular feature, the method comprises the following steps:

estimating a transfer matrix H defined as:

$$\begin{pmatrix} y_1 \\ y_2 \end{pmatrix} = H \begin{pmatrix} s_1 \\ s_2 \end{pmatrix} = \begin{pmatrix} h_{1,1} & h_{1,2} \\ h_{2,1} & h_{2,2} \end{pmatrix} \begin{pmatrix} s_1 \\ s_2 \end{pmatrix},$$

with $s_1$ the first signal, $s_2$ the second signal, $y_1$ a signal received with the common mode, and $y_2$ a signal received with the differential mode;

inverting the estimated transfer matrix $\hat{H}$; and estimating the first and second signals, using the product of the inverted estimated transfer matrix and the received signals:

$$\begin{pmatrix} \hat{s}_1 \\ \hat{s}_2 \end{pmatrix} = \hat{H}^{-1} \begin{pmatrix} y_1 \\ y_2 \end{pmatrix}.$$

In a first preferred implementation, in the step of estimating the transfer matrix H, the coefficients $h_{1,2}$ and $h_{2,1}$ are considered negligible and the transfer matrix H is considered as a diagonal matrix:

$$H = \begin{pmatrix} h_{1,1} & 0 \\ 0 & h_{2,2} \end{pmatrix}.$$

Thus the two transmission modes can be considered as independent channels and the processing for estimating and inverting the matrix is simplified.

In a second implementation, the step of estimating the transfer matrix H comprises:

estimating the coefficients $h_{1,1}$ and $h_{2,1}$, by transmitting a first reference signal $REF_1$ with the common mode while a first NULL signal is transmitted with the differential mode and before transmitting the first signal $s_1$; and estimating the coefficients $h_{1,2}$ and $h_{2,2}$, by transmitting a second reference signal $REF_2$ with the differential mode while a second NULL signal is transmitted with the common mode and before transmitting the second signal $s_2$.

According to a particular feature, the first and second signals ($s_1$, $s_2$) are transmitted in a full duplex operation on the multi-conductor cable.

According to a particular feature, the first and second signals ($s_1$, $s_2$) are transmitted, on the multi-conductor cable, between a first unit situated at a predetermined depth of a well and a second unit situated at the surface of the well.

According to a particular feature, at least one of the signals comprises seismic data, the multi-conductor cable being part of a seismic monitoring system.

The invention also relates to a signal transmission system between two units via a multi-conductor cable comprising a plurality of conductors surrounded by an armor, the plurality of conductors comprising a central conductor surrounded by a first peripheral layer of conductors comprising an even number of conductors symmetrically arranged around the central conductor. The two units are configured and adapted to carry out simultaneously the two following transmission modes:

a common mode that uses the central conductor with a return on the armor, for transmitting a first signal ($s_1$); and a differential mode between a first path comprising all odd rank conductors of the peripheral layer and a second path comprising all even rank conductors of the peripheral layer, for transmitting a second signal ($s_2$).

Advantageously, the units comprise means for implementing the method as described above, in any of its various embodiments.

According to a particular feature, the two units are a first unit, adapted to be situated at a predetermined depth of a well, and a second unit, adapted to be situated at the surface of the well.

According to a particular feature, each of the two units comprises:

a data processing unit;

a first transformer configured and adapted to transmit the first signal $s_1$ between the data processing unit and a first channel implementing the common mode and comprising the central conductor and the armor; and a second transformer configured and adapted to transmit the second signal $s_2$ between the data processing unit and a second channel implementing the differential mode and comprising the odd rank conductors and the even rank conductors of the peripheral layer.

According to a particular feature, one of the two units comprises a seismic data receiver configured to receive seismic data sensed by at least one seismic sensing tool.

The invention concerns also a seismic monitoring system implementing the method and/or including the signal transmission system as disclosed above and at least one seismic sensing tool.

BRIEF DESCRIPTION OF FIGURES

Other features and advantages of embodiments shall appear from the following description, given by way of indicative and non-exhaustive examples and from the appended drawings, of which.

DETAILED DESCRIPTION

In all of the figures of the present document, similar elements and steps are designated by the same numerical reference sign.

Figure 2:
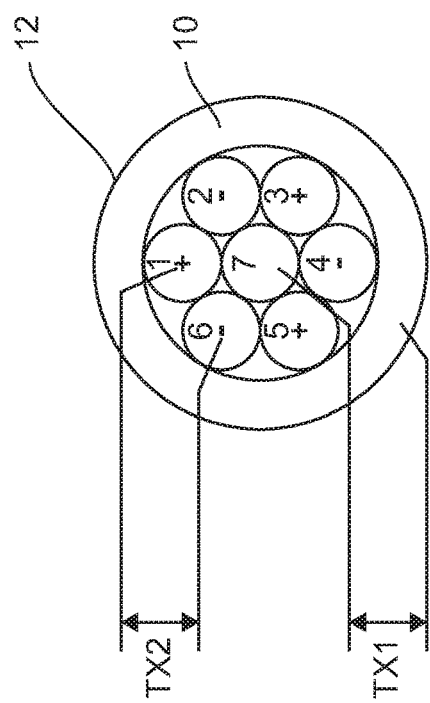
FIG. 2 illustrates a combination of two transmission modes according to an embodiment of the proposed method in a hepta-cable.
Figure 1:
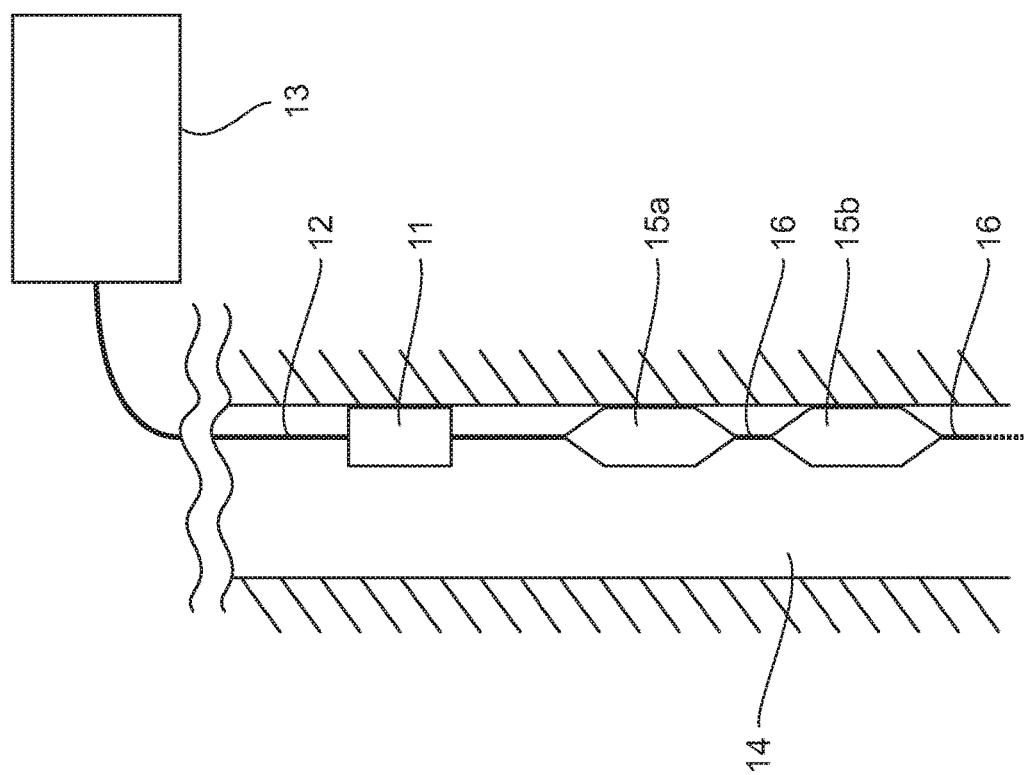
FIG. 1, already described with reference to the prior art, presents an example of seismic monitoring system.

FIG. 2 illustrates a combination of two transmission modes according to a preferred embodiment, wherein the cable 12 is a hepta-cable (as described above) and the two following transmission modes are carried out simultaneously:

a common mode TX1 (corresponding to a first channel C1) that uses the central conductor 7 with a return on the armor 10, for transmitting a first signal $s_1$; and a differential mode TX2 (corresponding to a second channel C2) between a first path comprising all odd rank conductors 1, 3 and 5 of the peripheral layer (also referred to as "positive conductors" in this example) and a second path comprising all even rank conductors 2, 4 and 6 of the peripheral layer (also referred to as "negative conductors" in this example), for transmitting a second signal $s_2$.

The cross-talk suffered by the central conductor 7 (used in the mode TX1) because a same negative signal is sent (in the mode TX2) on conductors 2, 4 and 6, is compensated by the cross-talk suffered by the central conductor 7 because a same positive signal (opposite to the previous one) is sent (also in the mode TX2) on conductors 1, 3 and 5. Similarly, the cross-talk suffered by the conductors 2, 4 and 6 (used in the mode TX2) because a signal $s_1$ is sent (in the mode TX1) on the central conductor 7, is compensated by the cross-talk suffered by conductors 1, 3 and 5 (also used in the mode TX2) because of the signal $s_1$ sent on the central conductor 7. These compensations occur since conductors 1-6 of the peripheral layer are symmetrically arranged around the central conductor 7. Moreover, the differential mode TX2 provides immunity to common mode noise. Cross-talk thereby is very low.

Figure 3:
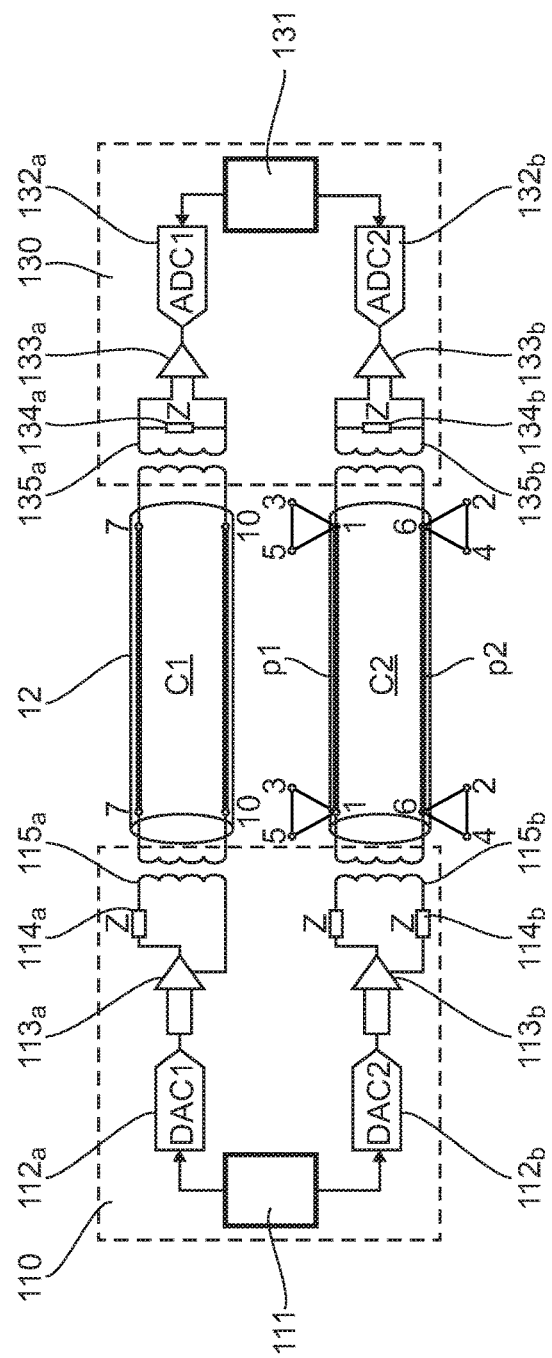
FIG. 3 illustrates a signal transmission system according to a particular embodiment of the invention.

As illustrated in FIG. 3, the aforesaid first and second signals $s_1$ and $s_2$ are transmitted, on the multi-conductor cable 12, between a first unit 110 situated at a predetermined depth of a well (up to 5 km, e.g. 3 km) and a second unit 130 situated at the surface of the well. For example, the first unit and the second unit are respectively a telemetry unit and a surface central unit which are parts of a seismic monitoring system, with one of the unit comprising means adapted to receive seismic signals, in particular sensed by at least one seismic sensing tool 15.

The two units 110 and 130 are configured and adapted to carry out simultaneously the two aforesaid transmission modes TX1 and TX2.

The first unit 110 comprises a data processing unit 111 to which are connected two branches.

The first branch of the first unit 110 is configured and adapted to transmit the first signal $s_2$ and comprises: a digital to analog converter (DAC1) 112a connected to the data processing unit 111; and a first transformer 115a having a primary winding connected to the digital to analog converter (DAC1) 112a via an amplifier 113a and an adaptation impedance, preferably a resistor, (Z) 114a, and a secondary winding connected to the first channel C1 implementing the common mode TX1 (i.e. comprising the central conductor 7 and the armor 10).

The second branch of the first unit 110 is configured and adapted to transmit the second signal $s_2$ and comprises: a digital to analog converter (DAC2) 112b connected to the data processing unit 111; and a second transformer 115b having a primary winding connected to the digital to analog converter (DAC2) 12b via an amplifier 113b and two adaptation impedances (Z) 114b, 114b', e.g. resistors, and a secondary winding connected to the second channel C2 implementing the differential mode TX2 (i.e. comprising the odd rank conductors 1, 3 and 5 (first path p1) and the even rank conductors 2, 4 and 6 (second path p2) of the peripheral layer).

The DACs 112a, 112b are used to transmit data sent by sensors 15a, 15b to the telemetry unit: high resolution and high speed would be needed to complete a high transmission data rate. In order to transmit a signal through a long cable (several kilometers) which attenuates signals, the output of the DACs 112a, 112b is amplified by amplifiers 113a, 113b.

The second unit 130 comprises a data processing unit 131 to which are connected two branches.

The first branch of the second unit 130 is configured and adapted to transmit the first signal $s_1$ and comprises: an analog to digital converter (ADC1) 132a connected to the data processing unit 131; and a first transformer 135a having a primary winding connected to the analog to digital converter (ADC1) 132a via a buffer 133a and an adaptation impedance or resistor (Z) 134a, and a secondary winding connected to the first channel C1 implementing the common mode TX1 (i.e. comprising the central conductor 7 and the armor 10).

The second branch of the second unit 130 is configured and adapted to transmit the second signal $s_2$ and comprises: an analog to digital converter (ADC2) 132b connected to the data processing unit 131; and a second transformer 135b having a primary winding connected to the analog to digital converter (ADC2) 132b via a buffer 133b and an impedance or resistor (Z) 134b', and a secondary winding connected to the second channel C2 implementing the differential mode TX2 (i.e. comprising the odd rank conductors 1, 3 and 5 (first path p1) and the even rank conductors 2, 4 and 6 (second path p2) of the peripheral layer).

For ensuring a high transmission data rate, like DACs 112a, 112b, ADCs 132a, 132b are accurate with a high speed. Presence of buffers 133a, 133b provides a low impedance drive and isolate the transient currents (generated at the input of the ADCs) from the signal source, but could also be omitted. Furthermore, impedances 134a, 134b allow adaptation of the transmission line with respect to the input impedances 114a, 114b.

For the differential mode (TX2), the transformers 115b, 135b allow to transmit the power through the cable and to obtain a perfect symmetry between the odd rank conductors 1, 3 and 5 and the even rank conductors 2, 4 and 6 used for the transmission.

For the common mode (TX1), the transformers 115a, 135a allow to eliminate the offset when sending data.

In this embodiment, the first and second signals $s_1$ and $s_2$ are transmitted in a full duplex operation on the multi-conductor cable, i.e. commands sent by the surface central unit 130 towards the telemetry unit 110 can be transmitted at the same time as the useful data sent from the telemetry unit 110 towards the surface central unit 130.

Figure 4:
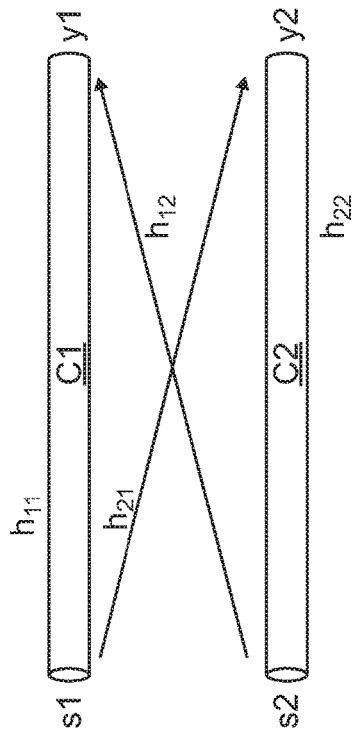
FIG. 4 illustrates the coefficients of a transfer matrix corresponding to the combination of two transmission modes illustrated in FIG. 3.

FIG. 4 illustrates the coefficients of a transfer matrix H corresponding to the combination of two transmission modes TX1 (common mode) and TX2 (differential mode) implemented by the first channel C1 and the second channel C2 respectively.

As already defined above, the first signals $s_1$ is transmitted by TX1 and the second signals $s_2$ is transmitted by TX2.

The transfer matrix H is defined as:

$$\begin{pmatrix} y_1 \\ y_2 \end{pmatrix} = H \begin{pmatrix} s_1 \\ s_2 \end{pmatrix} = \begin{pmatrix} h_{1,1} & h_{1,2} \\ h_{2,1} & h_{2,2} \end{pmatrix} \begin{pmatrix} s_1 \\ s_2 \end{pmatrix},$$

with $y_t$ the signal received with the common mode TX1, and $y_2$ the signal received with the differential mode TX2.

In order to estimate the first and second signals $s_1$ and $s_2$, a particular embodiment comprises the following steps:
estimating the transfer matrix H (the result is noted $\hat{H}$) (classically, the approximate values of the coefficients of the matrix are determined using an algorithm such as LMS (least mean square));
inverting the estimated transfer matrix $\hat{H}$; and
estimating the first and second signals $s_1$ and $s_2$ (the result is noted $\hat{s}_1$ and $\hat{s}_2$), using the product of the inverted estimated transfer matrix and the received signals:

$$\begin{pmatrix} \hat{s}_1 \\ \hat{s}_2 \end{pmatrix} = \hat{H}^{-1} \begin{pmatrix} y_1 \\ y_2 \end{pmatrix}.$$

In a first and advantageous implementation, the coefficients $h_{1,2}$ and $h_{2,1}$ are considered negligible and the transfer matrix H is considered as a diagonal matrix:

$$H = \begin{pmatrix} h_{1,1} & 0 \\ 0 & h_{2,2} \end{pmatrix}.$$

In other words, the transmissions TX1 and TX2 are considered independent and thus the overall transmission rate is the sum of the transmission rates of TX1 and TX2 taken separately.

Figure 5:
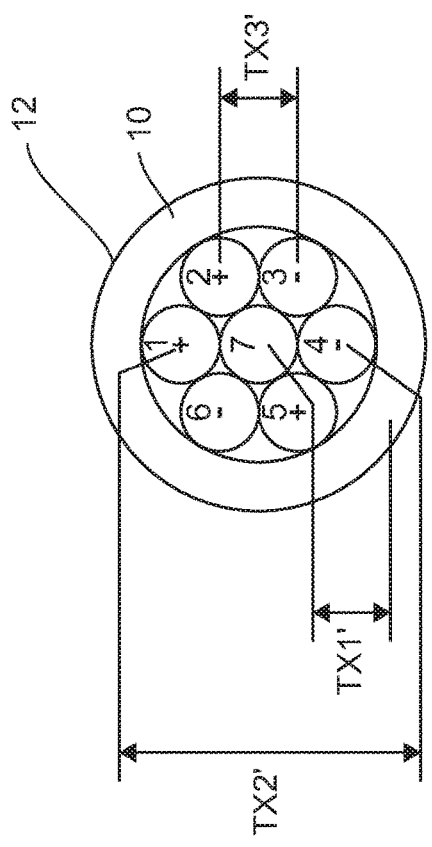
FIG. 5 illustrates a combination of two or three transmission modes according to comparative examples.

FIG. 5 illustrates a first comparative example, not part of the invention, with a combination of three transmission modes TX1', TX2' and TX3' carried out simultaneously on a hepta-cable 12:
a common mode TX1' identical to the common mode TX1 discussed above (use of the central conductor 7 with a return on the armor 10);
a first differential mode TX2' between a first path comprising conductor 1 (also referred to as "positive conductor" in this example) and a second path comprising conductor 4 (also referred to as "negative conductor" in this example); and
a second differential mode TX3' between a first path comprising conductors 2 and 5 (also referred to as "positive conductors in this example) and a second path comprising conductors 3 and 6 (also referred to as "negative conductors" in this example).

These three transmission modes TX1', TX2' and TX3' are used to transmit three signals, but the overall transmission rate is not tripled since there is too much cross-talk (e.g. the impact of TX1' on TX3' is important and degrades the signal because of cross-talk). For example, the transmission rate goes from 3.21 MBits/s with a single transmission TX1' (on the center of the cable) to 6.4 Mbits/s with the three transmissions modes TX1', TX2' and TX3' of FIG. 6. The overall transmission rate is only doubled because the cross-talk is no more neglected, which represents the same gain than using the combination of FIG. 3 (TX1 and TX2, according to a particular embodiment of the proposed method). Moreover, the use of the three transmission modes TX1', TX2' and TX3' requires tripling the hardware which highly increases the complexity, especially of the transformers, to send higher power supply.

Another comparative example combines TX2' and TX3': the cross-talk impacts the performance of the transmission and the transmission rate is not doubled. Consequently, the need of data processing to suppress the cross-talk is necessary.

Similarly, when considering simultaneous carrying out of the two differential transmission modes TX2' and TX3', the transmission rate goes from 2.7 Mbits/s with a single transmission TX2' to 3.52 Mbits/s using both TX2' (1.58 Mbits/s) and TX3' (1.94 Mbits/s) of FIG. 5. This represents a gain of only 30% and hence the cross-talk needs to be suppressed to increase the debit.

Figure 6:
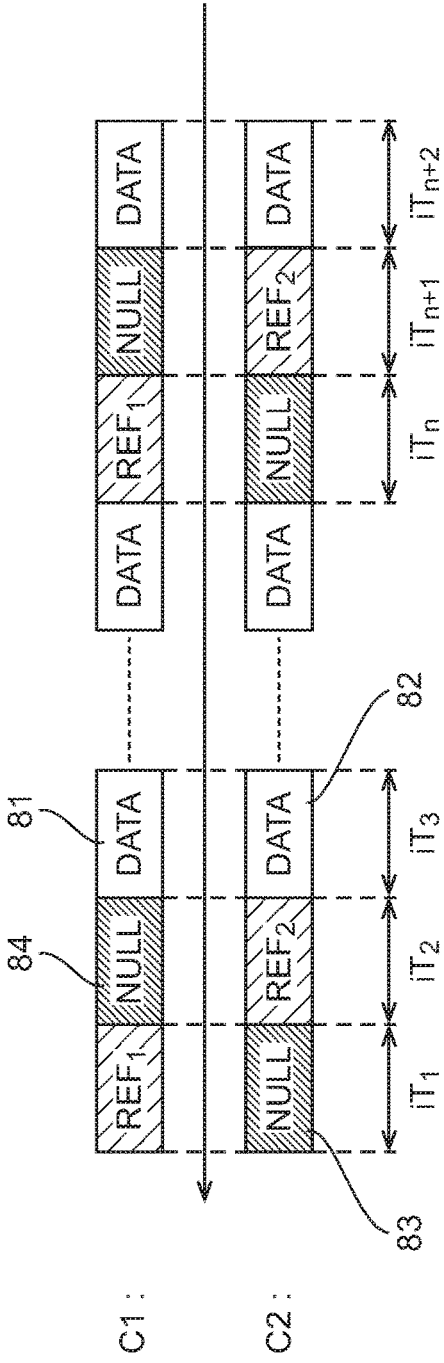
FIG. 6 illustrates steps of estimating the transfer matrix coefficients in an alternative embodiment of the proposed method.

FIG. 6 illustrates steps of estimating the transfer matrix coefficients in an alternative embodiment of the proposed method.

It has to be noted that in some cases, the ideal situation discussed above is not met, i.e. a non-negligible cross-talk may arise, therefore the coefficients $h_{1,2}$ and $h_{2,1}$ can not be considered negligible and the transfer matrix H can not be considered as a diagonal matrix. This is the case in particular:
if the cable is very long, e.g. more than 7 km, and/or is not made in one piece, with a connecting element between two parts of similar properties;
if the cable is old, with some alterations;

if the cable has been overheated several times;
if the cable is split in several sections or there is a umber of connections.

However, the proposed solution $$\left(\begin{pmatrix}\hat{s}_1\\\hat{s}_2\end{pmatrix}=\hat{H}^{-1}\begin{pmatrix}y_1\\y_2\end{pmatrix}\right)$$

is still applicable and allows the doubling of the transmission rate, provided a simple adaptation of the transfer matrix, with a former determination of its coefficients.

In this embodiment illustrated in FIG. 6, the step of estimating the transfer matrix H comprises:
estimating coefficients $h_{1,2}$ and $h_{2,1}$, by transmitting a first reference signal $REF_1$ with the common mode TX1 (i.e. on the first channel C1) during a first time interval IT1, while a first NULL signal 83 is transmitted with the differential mode TX2 (i.e. on the second channel C2);
estimating the coefficients $h_{1,2}$ and $h_{2,2}$, by transmitting a second reference signal $REF_2$ with the differential mode TX2 (i.e. on the second channel C2) during a second time interval IT2 (which follows the first time interval IT1), while a second NULL signal 84 is transmitted with the common mode TX1 (i.e. on the first channel C1);
during a third time interval IT3, transmitting a portion (DATA block) 81 of the first signal $s_1$ with the common mode TX1 (i.e. on the first channel C1) and, simultaneously, transmitting a portion (DATA block) 82 of the second signal $s_2$ with the differential mode TX2 (i.e. on the second channel C2).

This is repeated on several triplets of successive time intervals $IT_n$, $IT_{n+1}$ and $IT_{n+2}$.

There might be an overlap of the first and second NULL signals 83, 84, with no transmission during one period. This should be necessary to calculate the electrical noise of each channel C1, C2.

The first and second reference signals ($REF_1$, $REF_2$) might be different between both channels.

Although the present disclosure has been described with reference to one or more examples, workers skilled in the art will recognize that changes may be made in form and detail without departing from the scope of the disclosure and/or the appended claims.

The first and second channels C1, C2 can use any type of modulation: single carrier modulation (one frequency carrier is used) or multi-carrier modulation (use of multiple carrier signals at different frequencies to transmit a wide band signal).

Any type of multi-conductor cable can be used, provided the central conductor is surrounded by a (first) peripheral layer of conductors comprising an even number of conductors symmetrically arranged around the central conductor. The differential mode TX2 (corresponding to the second channel C2) is carried out between a first path comprising all odd rank conductors of the (first) peripheral layer and a second path comprising all even rank conductors of the (first) peripheral layer, for transmitting the second signal $s_2$.

The multi-conductor cable can comprise at least one other (second) peripheral layer of conductors surrounding the first peripheral layer of conductors. In that case, the conductors of the second peripheral layer might be used as electrically connected to the central conductor or armor and used for the return in the common mode TX1, or it can also be used for power transmission.

The invention claimed is:

1. Method for transmitting signals on a multi-conductor cable, the cable having a plurality of conductors surrounded by an armor, the plurality of conductors arranged as a central conductor surrounded by a first peripheral layer of conductors with an even number of conductors symmetrically arranged around the central conductor, said method comprising the steps of:
two transmission modes being carried out simultaneously:
a common mode that uses the central conductor with a return on the armor, for transmitting a first signal; and
a differential mode between a first path comprising all odd rank conductors of the peripheral layer and a second path comprising all even rank conductors of the peripheral layer, for transmitting a second signal.

2. Method according to claim 1, wherein the multi-conductor cable is a hepta-cable comprising a central conductor surrounded by a single peripheral layer comprising six conductors.

3. Method according to claim 1, wherein the method further comprises the following steps:
estimating a transfer matrix H defined as:

$$\begin{pmatrix}y_1\\y_2\end{pmatrix}=H\begin{pmatrix}s_1\\s_2\end{pmatrix}=\begin{pmatrix}h_{1,1}&h_{1,2}\\h_{2,1}&h_{2,2}\end{pmatrix}\begin{pmatrix}s_1\\s_2\end{pmatrix},$$

with $s_1$ the first signal, $s_2$ the second signal, $y_1$ a signal received with the common mode, and $y_2$ a signal received with the differential mode;
inverting the estimated transfer matrix $\hat{H}$; and
estimating the first and second signals, using the product of the inverted estimated transfer matrix and the received signals:

$$\begin{pmatrix}\hat{s}_1\\\hat{s}_2\end{pmatrix}=\hat{H}^{-1}\begin{pmatrix}y_1\\y_2\end{pmatrix}.$$

4. Method according to claim 3, wherein, in the step of estimating the transfer matrix H, the coefficients $h_{1,2}$ and $h_{2,1}$ are considered negligible and the transfer matrix H is considered as a diagonal matrix:

$$H=\begin{pmatrix}h_{1,1}&0\\0&h_{2,2}\end{pmatrix}.$$

5. Method according to claim 3, wherein the step of estimating the transfer matrix H further comprises:
estimating the coefficients $h_{1,1}$ and $h_{2,1}$, by transmitting a first reference signal $REF_1$ with the common mode while a first NULL signal is transmitted with the differential mode and before transmitting the first signal $s_1$; and
estimating the coefficients $h_{1,2}$ and $h_{2,2}$, by transmitting a second reference signal $REF_2$ with the differential mode while a second NULL signal is transmitted with the common mode and before transmitting the second signal $s_2$.

6. Method according to claim 1, wherein the first and second signals are transmitted in a full duplex operation on the multi-conductor cable.

7. Method according to claim 1, wherein the first and second signals are transmitted, on the multi-conductor cable, between a first unit situated at a predetermined depth of a well and a second unit situated at the surface of the well.

8. Method according to claim 1, wherein at least one of the signals carries seismic data, the multi-conductor cable being part of a seismic monitoring system.

9. Signal transmission system between two units via a multi-conductor cable formed from a plurality of conductors surrounded by an armor, the plurality of conductors having a central conductor surrounded by a first peripheral layer of conductors with an even number of conductors symmetrically arranged around the central conductor, said system comprising:
two units, configured and adapted to carry out simultaneously the two following transmission modes:
a common mode that uses the central conductor with a return on the armor, for transmitting a first signal; and
a differential mode between a first path having all odd rank conductors of the peripheral layer and a second path having all even rank conductors of the peripheral layer, for transmitting a second signal.

10. Signal transmission system according to claim 9, wherein the two units are a first unit, adapted to be situated at a predetermined depth of a well, and a second unit, adapted to be situated at the surface of the well.

11. Signal transmission system according to claim 9, wherein each of the two units comprises:
a data processing unit;
a first transformer configured and adapted to transmit the first signal between the data processing unit and a first channel implementing the common mode and comprising the central conductor and the armor; and
a second transformer configured and adapted to transmit the second signal between the data processing unit and a second channel implementing the differential mode and having the odd rank conductors and the even rank conductors of the peripheral layer.

12. Signal transmission system according to claim 9, wherein one of the two units comprises a seismic data receiver configured to receive seismic data sensed by at least one seismic sensing tool.

13. Seismic monitoring system comprising:
the signal transmission system according to claim 12; and
at least one seismic sensing tool.

14. Seismic monitoring system comprising:
a first unit and a second unit;
a multi-conductor cable formed from a plurality of conductors surrounded by an armor, the plurality of conductors having a central conductor surrounded by a first peripheral layer of conductors with an even number of conductors symmetrically arranged around the central conductor,
wherein said two units are configured and adapted to carry out simultaneously the two following transmission modes:
a common mode that uses the central conductor with a return on the armor, for transmitting a first signal, and
a differential mode between a first path having all odd rank conductors of the peripheral layer and a second path having all even rank conductors of the peripheral layer, for transmitting a second signal.

15. The seismic monitoring system as claimed in claim 14, wherein said first unit is a telemetry unit located at a predetermined depth within a well.

16. The seismic monitoring system as claimed in claim 15, wherein said second unit is a surface central unit located at a surface of the well.

17. The seismic monitoring system as claimed in claim 14, wherein said second unit is a seismic data receiver configured to receive seismic data sensed by at least one seismic sensing tool.

18. The seismic monitoring system as claimed in claim 14, wherein the multi-conductor cable is a hepta-cable comprising a central conductor surrounded by a single peripheral layer comprising six conductors.

19. The seismic monitoring system as claimed in claim 14, wherein at least one of the signals carries seismic data.

20. The seismic monitoring system as claimed in claim 14, wherein the cable between said first and second units is configured to carry signals there between in a full duplex operation on the multi-conductor cable.

* * * * *